(12) United States Patent
Matsuo (10) Patent No.: US 11,379,162 B1
(45) Date of Patent: Jul. 5, 2022

(54) PRINTING SYSTEM USING JOB TEMPLATE

(71) Applicant: KYOCERA Document Solutions Inc., Osaka (JP)

(72) Inventor: Taku Matsuo, Los Angeles, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/163,518

(22) Filed: Jan. 31, 2021

(51) Int. Cl.
*G06F 3/12* (2006.01)

(52) U.S. Cl.
CPC ............ *G06F 3/1205* (2013.01); *G06F 3/126* (2013.01); *G06F 3/1274* (2013.01); *G06F 3/1275* (2013.01); *G06F 3/1282* (2013.01)

(58) Field of Classification Search
None
See application file for complete search history.

(56) References Cited

U.S. PATENT DOCUMENTS

| | | | |
|---|---|---|---|
| 5,579,810 A * | 12/1996 | Ramsey | B21F 33/04 140/3 CA |
| 6,407,820 B1 | 6/2002 | Hansen et al. | |
| 6,411,314 B1 | 6/2002 | Hansen et al. | |
| 6,665,587 B2 | 12/2003 | Leone, III et al. | |
| 8,826,162 B2 * | 9/2014 | Touyamasaki | H04N 1/00416 715/764 |
| 2006/0080616 A1 | 4/2006 | Vogel et al. | |
| 2006/0224440 A1 | 10/2006 | Rai | |
| 2007/0113164 A1 | 5/2007 | Hansen et al. | |
| 2012/0218590 A1 * | 8/2012 | Dumitrescu | G06F 3/1275 358/1.15 |
| 2017/0003923 A1 | 1/2017 | Hane | |
| 2019/0272133 A1 * | 9/2019 | Liebelt | G06F 3/1282 |

* cited by examiner

*Primary Examiner* — Eric A. Rust
(74) *Attorney, Agent, or Firm* — Hawaii Patent Services; Nathaniel K. Fedde; Kenton N. Fedde

(57) ABSTRACT

Provided is an industrial printing system for industrial printing that can automatically process each composing job of a workflow according to the dependency. An order management unit manages each job that composes an order, which is the final product of the workflow of the industrial printing, as an order template. A job management unit calculates the job to be changed from each job managed by the order management unit when the job management unit acquires order change information. A job ticket management unit generates a job ticket for requesting change processing of a job to be changed calculated by the job management unit. A workflow processing unit performs the change processing of the job to be changed based on the job ticket generated by the job ticket management unit.

20 Claims, 10 Drawing Sheets

PRINTING SYSTEM USING JOB TEMPLATE

BACKGROUND

The present disclosure relates to an industrial printing system, a server, and an industrial printing management method, and particularly to an industrial printing system, a server, and an industrial printing management method used for industrial printing.

In industrial printing, which is also called production printing, uses commercial (industrial) printing apparatus, and the components of the final product are produced by dividing the labor in multiple processes. For example, in the case of bookbinding, a cover, a body (color), a body (black and white), a promotional material, a band, a shipping envelope, or the like, are processed as different jobs. Then, in the middle of the process, each job is combined and finished as a final product, which is the book.

As a typical industrial printing system, a system and a method for managing an industrial printing workflow exist. This system includes workflow management software that manages and facilitates workflow procedures, including job creation, job preparation, job submission, and job execution. In this workflow management software provides an integrated object-oriented interface that visually reflects and interacts with workflows.

SUMMARY

An industrial printing system of the present disclosure includes: an order management unit that manages each of jobs that composes an order, which is the final product of a workflow of industrial printing, as an order template; a job management unit that calculates a job to be changed from each of the jobs managed by the order management unit when change information of the order is acquired; a job ticket management unit that generates a job ticket for requesting change processing of the job to be changed that is calculated by the job management unit; and a workflow processing unit that performs the change processing of the job to be changed based on the job ticket generated by the job ticket management unit.

A server of the present disclosure includes: an order management unit that manages each of jobs that composes an order, which is the final product of a workflow of industrial printing, as an order template; a job management unit that calculates a job to be changed from each of the jobs managed by the order management unit when change information of the order is acquired; a job ticket management unit that generates a job ticket for requesting change processing of the job to be changed that is calculated by the job management unit; and a workflow processing unit that performs the change processing of the job to be changed based on the job ticket generated by the job ticket management unit.

An industrial print management method of the present disclosure is an industrial print management method executed by an industrial print system, includes the steps of: managing each of jobs that composes an order, which is the final product of a workflow of industrial printing, as an order template; calculating a job to be changed from each of managed jobs when change information of the order is acquired; generating a job ticket for requesting change processing of being calculated job to be changed; and performing the change processing of the job to be changed based on generated job ticket.

DETAILED DESCRIPTION

Embodiment

[System Configuration of Industrial Printing System X of the Present Embodiment]

Figure 1:
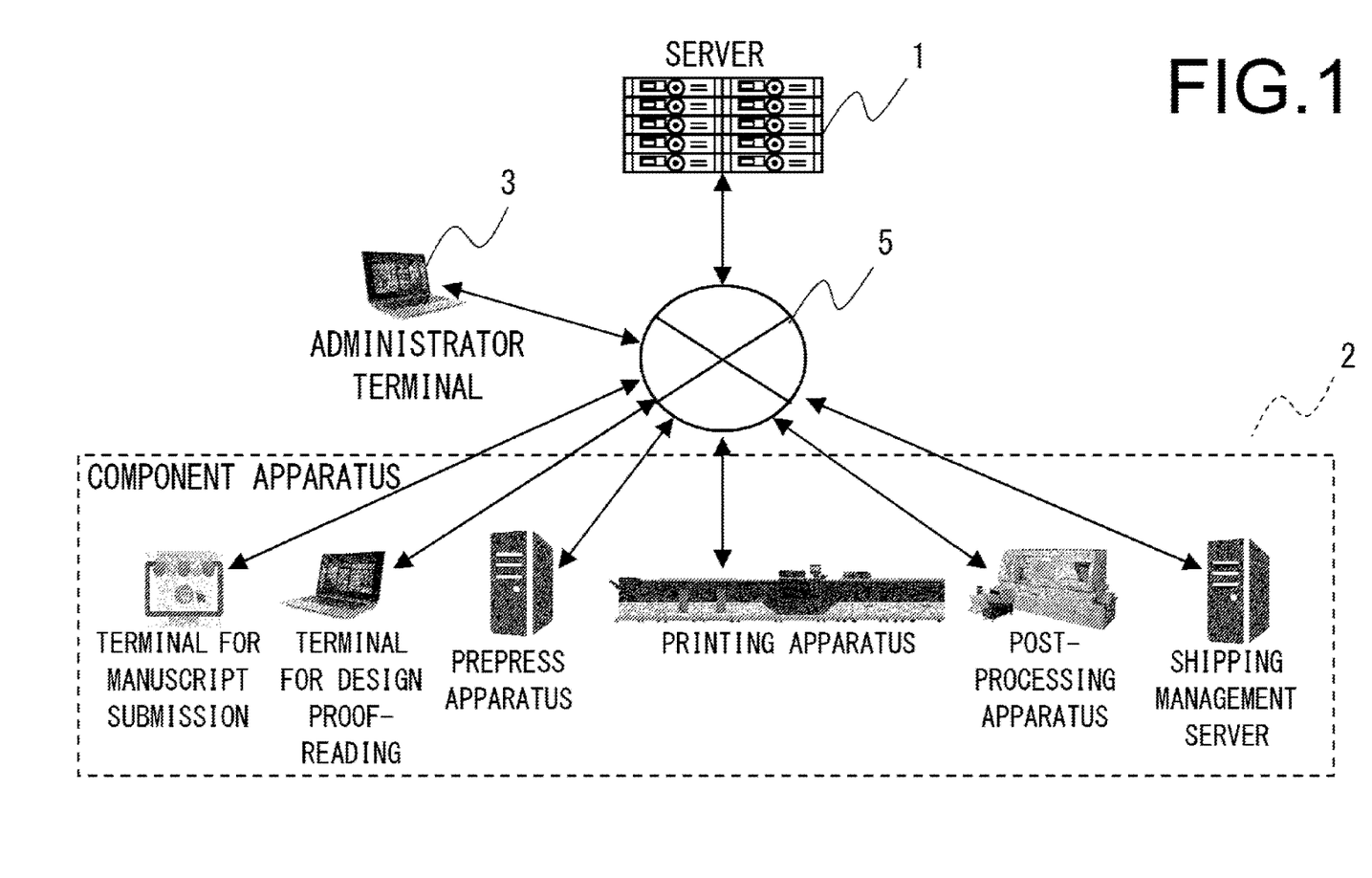
FIG. 1 is a system configuration diagram of an industrial printing system according to an embodiment of the present disclosure.

Firstly, with reference to FIG. 1, a system configuration of an industrial printing system X of the present embodiment is described.

The industrial printing system X of the present embodiment is a system that manages a workflow for industrial printing. Here, in the industrial printing system X of the present embodiment, the final product such as an output book, or the like, is set as an "order", and each component of the order is called as a job. In the industrial printing system X of the present embodiment, each job for outputting the order is assigned to the component apparatus 2 and managed by the workflow.

The industrial printing system X of the present embodiment includes a server 1, a component apparatus 2, and an administrator terminal 3, and each apparatus is connected by a network 5.

Server 1 is a server for managing the workflow. The server 1 is a PC (Personal Computer) server, a dedicated apparatus, a general-purpose apparatus, or the like, which is installed on a so-called cloud or at user's whereabouts.

Moreover, the server 1 manages the workflow of industrial printing by executing the dedicated printing process management application software (hereinafter, simply referred to as "application"). This print order management application may be run on the server 1, which can execute a common platform for user management, tenant management, security management, maintenance notification services, prepress management, document storage management, printing apparatus management, or the like.

Specifically, the server 1 sends and receives various instructions and information to and from the component apparatus 2 of each process to manage the status of each component apparatus 2 and request processing. At this time, the server 1 sets the dependency between a plurality of jobs composing the order by using each template as described later. The server 1 processes each composing job for unplanned processing (exception handling) such as change and cancellation that occurs in the order according to the dependency.

The component apparatus 2 is a component that executes various jobs of industrial printing and is each apparatus managed by the server 1. The component apparatus 2 includes, for example, a terminal for manuscript submission, a terminal for design proofreading, a prepress apparatus, a printing apparatus for industrial printing, a post-processing apparatus, a shipping management server, and the like. In the present embodiment, one of these apparatuses is simply referred to as a component apparatus 2. Among the component apparatuses 2, each terminal or server can be connected to the server 1 by using a web browser or an application in a PC, a smartphone, or the like.

The administrator terminal 3 is a terminal of the administrator of the printing process. The administrator terminal 3 allows the administrator to access the server 1 to check the progress status and request processing.

Next, the control configuration of the server 1 is described with reference to FIG. 2.

The server 1 includes a control unit 10, a network transmission/reception unit 15, a storage unit 19, and the like. Each unit is connected to the control unit 10 and its operation is controlled by the control unit 10.

The control unit 10 is an information processing unit such as a GPP (General Purpose Processor), a CPU (Central Processing Unit), an MPU (Micro Processing Unit), a DSP (Digital Signal Processor), a GPU (Graphics Processing Unit), and an ASIC (Application Specific Integrated Circuit, a processor for specific applications), or the like.

The control unit 10 reads out the control program stored in the ROM or HDD of the storage unit 19, expands the control program in the RAM, and executes the control program, so that the control unit 10 can be operated as each part of the functional block as described later. In addition, the control unit 10 controls the entire apparatus according to instruction information input from the administrator terminal 3 or a console.

The network transmission/reception unit 15 is a network connection unit including a LAN board, a wireless transmitter/receiver, or the like, for connecting to an external network 5. The network 5 of the present embodiment is, for example, a LAN, a wireless LAN, a WAN, a mobile phone network, a voice telephone network, or the like.

The network transmission/reception unit 15 transmits/receives data on a data communication line and transmits/receives a voice signal on a voice telephone line.

The storage unit 19 is a non-transitory recording medium such as a semiconductor memory, which is a ROM (Read Only Memory), a RAM (Random Access Memory), or the like, or an HDD (Hard Disk Drive), or the like.

In the ROM or HDD of the storage unit 19, a control program for controlling the operation of the server 1 is stored. The control program includes an OS (Operating System), middleware on the OS, services (daemons), various applications, database data, and the like. Among these, various applications include the above-mentioned printing process management application.

In addition to this, the storage unit 19 also stores the account settings of the user and the administrator of the industrial printing system X. Further, a storage area for each user may be set in the storage unit 19.

In addition, in the server 1, the control unit 10 may be integrally formed such as a GPU built-in CPU, a chip-on module package, an SOC (System On a Chip), or the like.

Further, the control unit 10 may have a built-in RAM, ROM, flash memory, or the like.

[Functional Configuration of Server 1]

Figure 2:
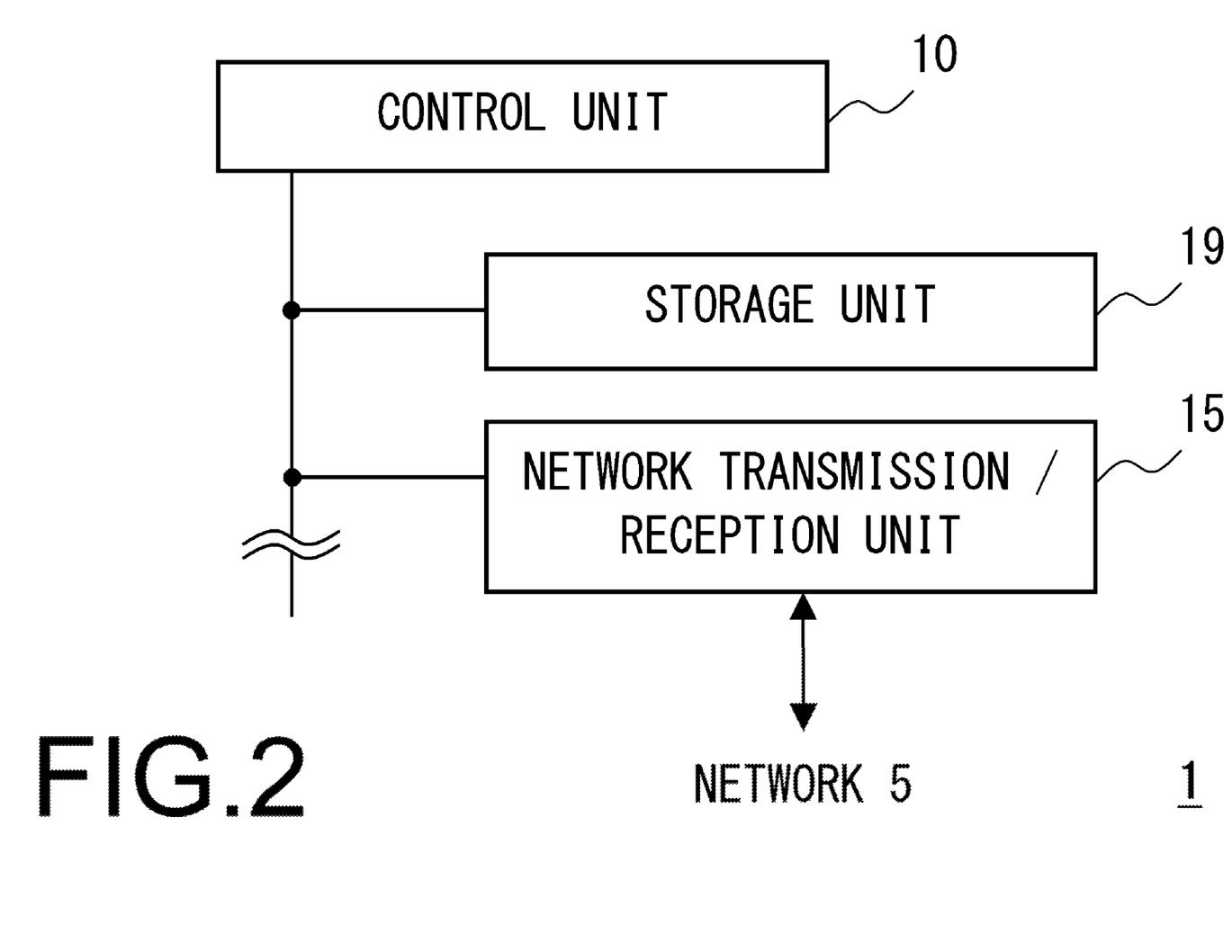
FIG. 2 is a block diagram showing a control configuration of the server as shown in FIG. 1.

Here, with reference to FIG. 2, the functional configuration of the server 1 is described.

At first, an outline of each functional unit of the industrial printing system X of the present embodiment is described.

Figure 3:
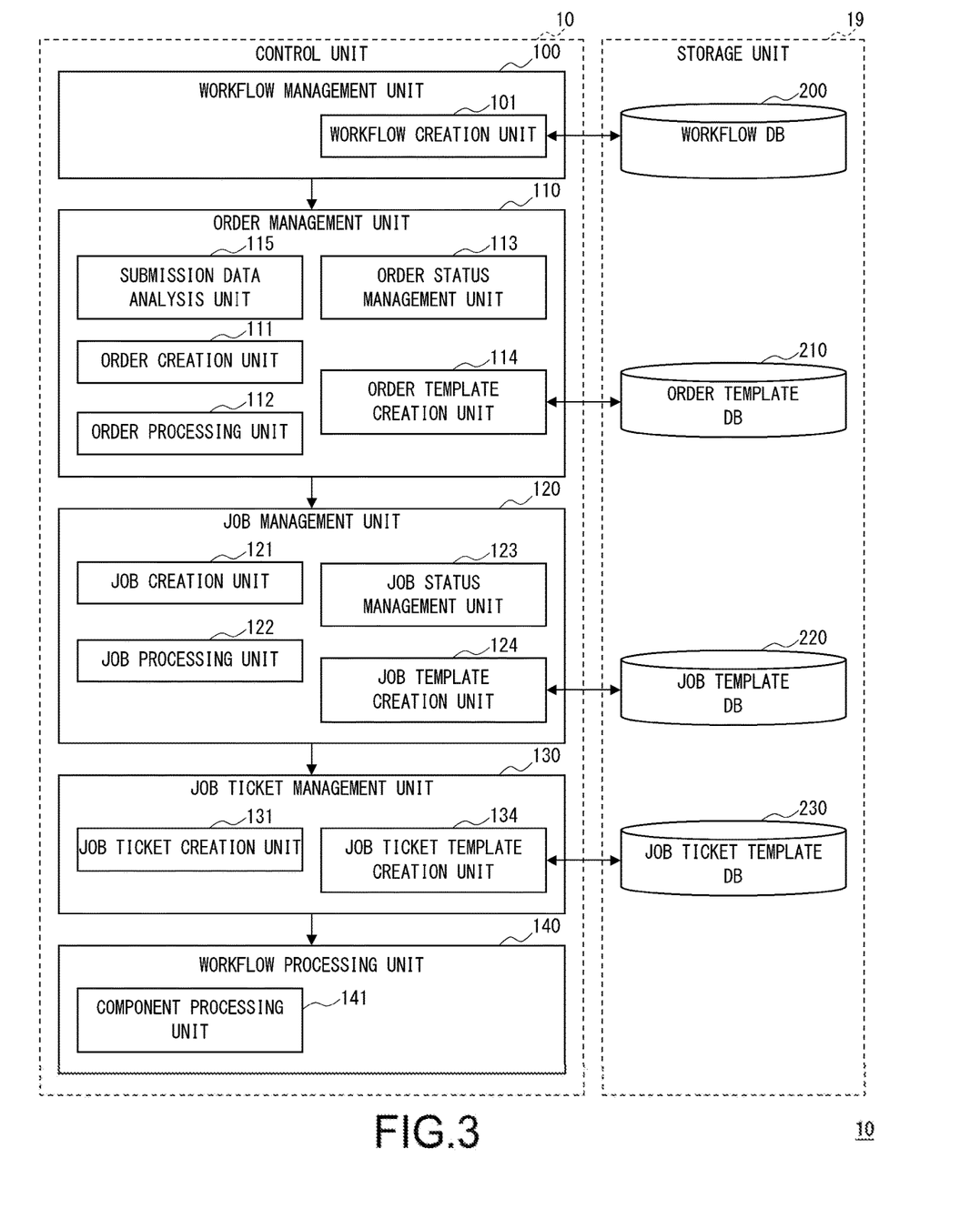
FIG. 3 is a block diagram showing a functional configuration of the industrial printing system according to the embodiment of the present disclosure.

The control unit 10 of the server 1 includes a workflow management unit 100, an order management unit 110, a job management unit 120, a job ticket management unit 130, and a workflow processing unit 140.

The storage unit 19 stores the workflow DB 200, the order template DB 210, the job template DB 220, and the job ticket template DB 230.

The workflow management unit 100 creates and manages a workflow. Therefore, the workflow management unit 100 also provides a user interface for the administrator terminal 3.

The order management unit 110 manages each job that composes an order, which is the final product of the workflow of industrial printing, as an order template. Here, the order management unit 110 can acquire order change information indicating a change in the order contents from the administrator terminal 3 or the component apparatus 2.

The job management unit 120 calculates the job to be changed from each job managed by the order management unit 110 when the order change information is acquired.

The job ticket management unit 130 generates a job ticket for requesting the change processing of the job to be changed that is calculated by the job management unit 120. Here, the job ticket of the present embodiment is, for example, instruction data for requesting processing to each component apparatus 2 corresponding to each component of the workflow.

At this time, the job ticket management unit 130 can check the status of the job to be changed. If it is already in the completed status, the job ticket management unit 130 can identify a downstream incomplete job.

Furthermore, if the job ticket management unit 130 can cancel all incomplete jobs, it is also possible to cancel all incomplete jobs and generate a job ticket corresponding to the changed contents.

Alternatively, if apart of the incomplete job can be canceled, the job ticket management unit 130 can also divide the canceled job and the sustainable job and process separately. In this case, the job ticket management unit 130 can also generate a job ticket by the changed contents for the canceled job. The job ticket management unit 130 can also generate a job ticket for a sustainable job by removing the part to be canceled (canceled part).

On the other hand, the job management unit 120 can also continue or cancel related jobs, which is not subject to change, based on the job settings.

The workflow processing unit 140 performs change processing of the job to be changed based on the job ticket generated by the job ticket management unit 130.

The workflow DB 200 is a database that stores the workflow. The workflow DB 200 structurally stores each data of the workflow itself. Specifically, for example, the workflow of the present embodiment is data in which components for each process for processing each composing job of the order are linked. This component is data summarizing instructions to the corresponding component apparatus 2.

The order template DB 210 is a database that stores an order template, which is template data indicating the settings of each process of the order. The details of this order template are described later.

The job template DB 220 is a database that stores the job template that is template data indicating the settings of each job specified in the order template. Details of this job template is described later.

The job ticket template DB 230 is job ticket template data which is instruction data for requesting processing to each component apparatus 2 according to the present embodiment. The instruction data of the job ticket of the present embodiment is configured that, for example, a command to the component apparatus 2, the content of an e-mail indicating an instruction to the user of the terminal of each process, and the like.

Here, these functional parts are explained in more detail.

The workflow management unit 100 includes the workflow creation unit 101.

The order management unit 110 includes an order creation unit 111, an order processing unit 112, an order status management unit 113, an order template creation unit 114, and a submission data analysis unit 115.

The job management unit 120 includes a job creation unit 121, a job processing unit 122, a job status management unit 123, and a job template creation unit 124.

The job ticket management unit 130 includes a job ticket creation unit 131 and a job ticket template creation unit 134.

The workflow processing unit 140 includes the component processing unit 141.

The workflow creation unit 101 creates a workflow for executing the processing based on the specifications of each component apparatus 2 of industrial printing from the order information, which is the information of the set order, according to the instruction of the administrator.

The order creation unit 111 selects an order template from the order information and creates an order. Further, the order creation unit 111 requests the job creation unit 121 to create a job from the job template and the order information included in the order template.

The order processing unit 112 requests the order creation unit 111 to create an order according to the order information. Further, the order processing unit 112 requests the job processing unit 122 to process each composing job according to the corresponding workflow setting.

The order status management unit 113 holds the order status and processing result information, and it returns the held information in response to the inquiry. The status of the order includes, for example, the completion or incompletion of the job, the presence or absence of unplanned work, and the like. Among these, the unplanned work includes the job change and cancellation.

The order template creation unit 114 creates an order template by combining job templates. In addition, the order template creation unit 114 sets attributes to be managed by the order such as customer information, delivery date information, and the like. Further, the order template creation unit 114 sets a workflow template for processing the order. In addition, the order template creation unit 114 requests the creation of the job ticket template.

The submission data analysis unit 115 extracts necessary information from the order information and passes it to the order processing unit 112 and the job processing unit 122. Further, the submission data analysis unit 115 identifies the job to be changed from the order change information, and it passes the change content to the order processing unit 112 and the job processing unit 122.

The job creation unit 121 creates job data at the request of the order creation unit 111. Further, the job creation unit 121 requests the job ticket creation unit 131 to create a job ticket.

The job processing unit 122 requests the component processing unit 141 to process the corresponding job at the request of the order processing unit 112. Further, the job processing unit 122 inquires the job status management unit 123 about the status of the corresponding job from the change target job and the change content information, confirms the status, and identifies an incomplete job. Further, the job processing unit 122 requests the job ticket creation unit 131 to create a job ticket for change processing. Further, the job processing unit 122 requests the component processing unit 141 for the change processing together with the job ticket for the change processing.

The job status management unit 123 holds the job status and processing result information, and it returns the held information in response to the inquiry.

The job template creation unit 124 registers the necessary part as a template based on the specifications of the industrial printing system X.

The job ticket creation unit 131 creates a job ticket from the job ticket template. In addition, the job ticket creation unit 131 creates a job ticket for change processing from the order change information.

The job ticket template creation unit 134 creates the job ticket template, which is the template of the job ticket, from the setting contents of the order template and the job template.

The component processing unit 141 controls the corresponding component apparatus 2 to execute the component processing at the request of the job processing unit 122 based on the contents of the job ticket.

Figure 4:
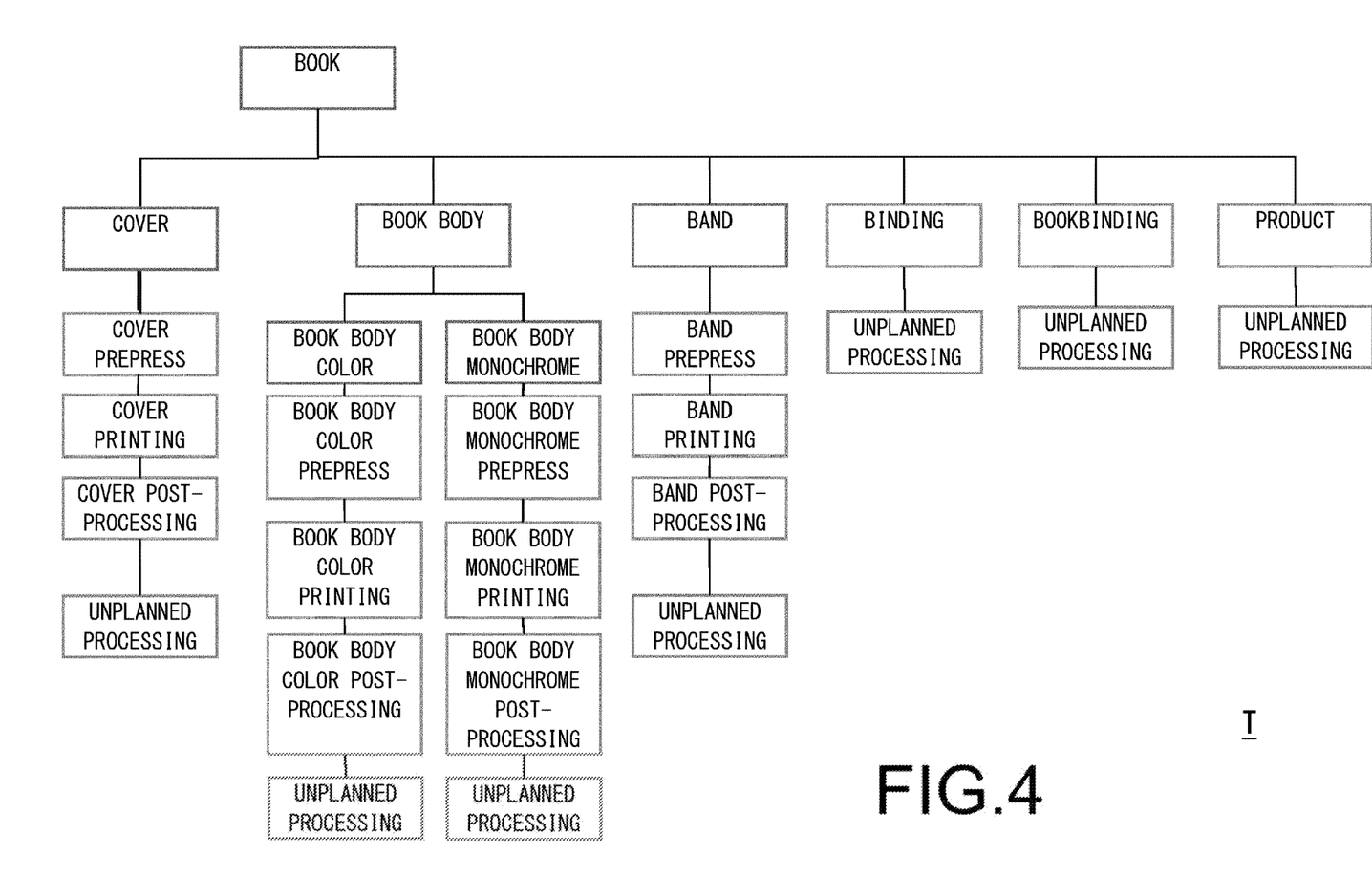
FIG. 4 is a conceptual diagram of the order template included in the order template DB shown in FIG. 3.
Figure 5:
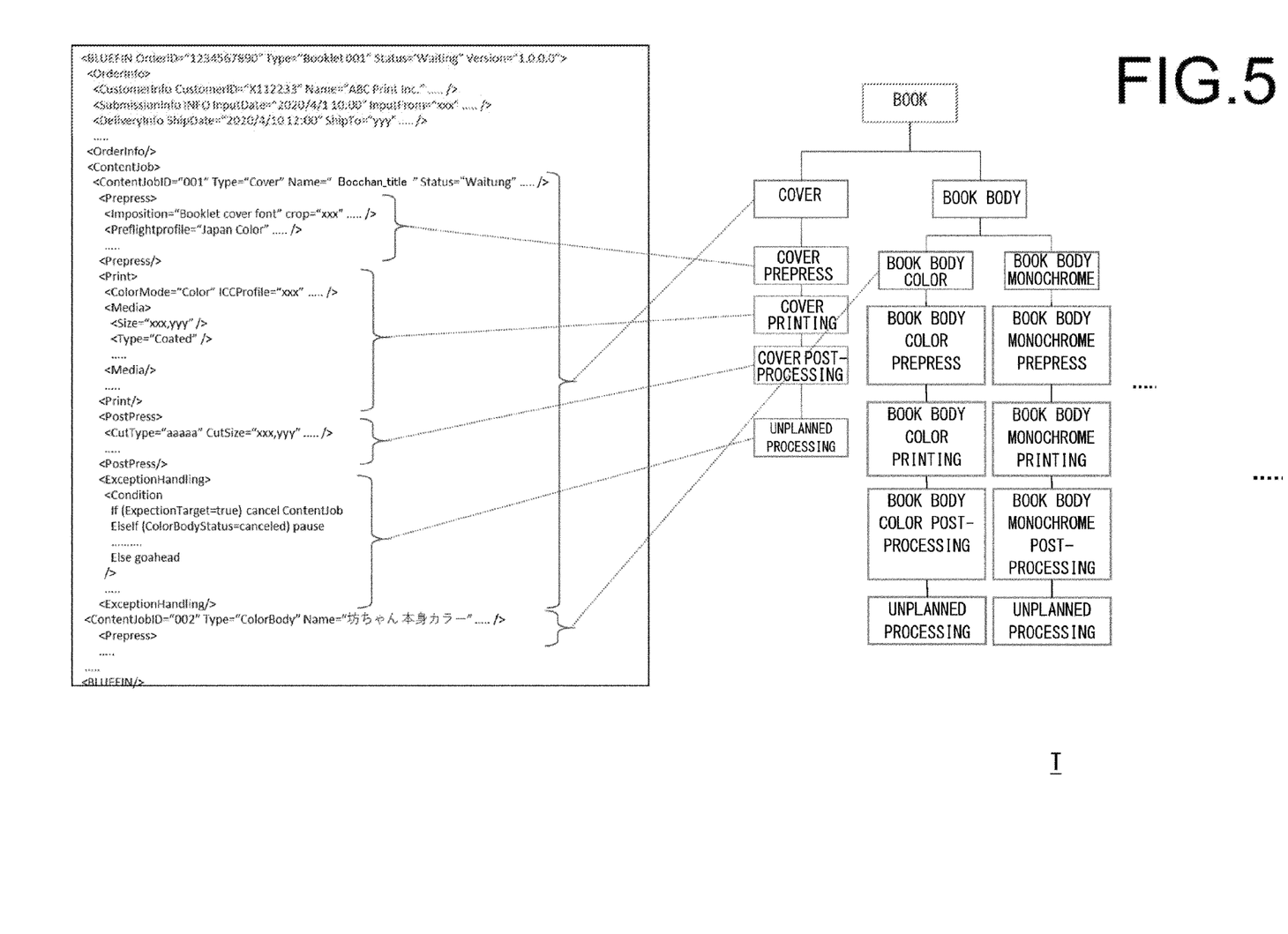
FIG. 5 is an example of the structural data of the order template as shown in FIG. 4.

Next, with reference to FIGS. 4 and 5, the details of the order template of the present embodiment is described.

According to FIG. 4, data having the following structure is internally created as the order template T.

The order template T of the present embodiment sets a workflow for producing the order, which is the final product, by combining job templates, which are the parts. In the example of FIG. 4, for example, job templates such as "cover", "book body", "band", "binding", "bookbinding", "product", and the like, which are parts necessary for producing the order "book", are combined. For each job template, for example, a job template of "book body color" and "book body monochrome" may be set for "book body". In addition, the job template such as further setting, unplanned processing, or the like, is set for each job template.

FIG. 4 shows an example in which the left side and the upper side are the upstream jobs performed earlier, and the right side and the lower side are the downstream jobs performed later.

FIG. 5 shows an example of structured data of the order template T. In this way, the value of each element of the structured data is set by the information acquired from the administrator terminal 3 and each component apparatus 2. The job template in the order template T is held as data of an object of the job (the job object). In addition, in the present embodiment, processing is set if unplanned processing occurs in each job template of the order template T. In this example, if the unplanned processing occurs, a processing can be performed based on the object of the unplanned processing setting (ExceptionHandling), which is specified in advance.

Here, the control unit 10 of the server 1 executes the control program stored in the storage unit 19 and is made to function as the workflow management unit 100, the order management unit 110, the job management unit 120, the job ticket management unit 130, and the workflow processing unit 140.

In addition, each part of the server 1 as described above serves as a hardware resource for executing the industrial print management method according to the present disclosure.

Note that a part or any combination of the above-mentioned functional configurations may be configured in terms of hardware or circuit by IC, programmable logic, FPGA (Field-Programmable Gate Array), or the like.

[Workflow Process by Server 1]

Next, with reference to FIGS. 6 to 9, the outline of the workflow process by the server 1 according to the present embodiment is described.

Figure 6:
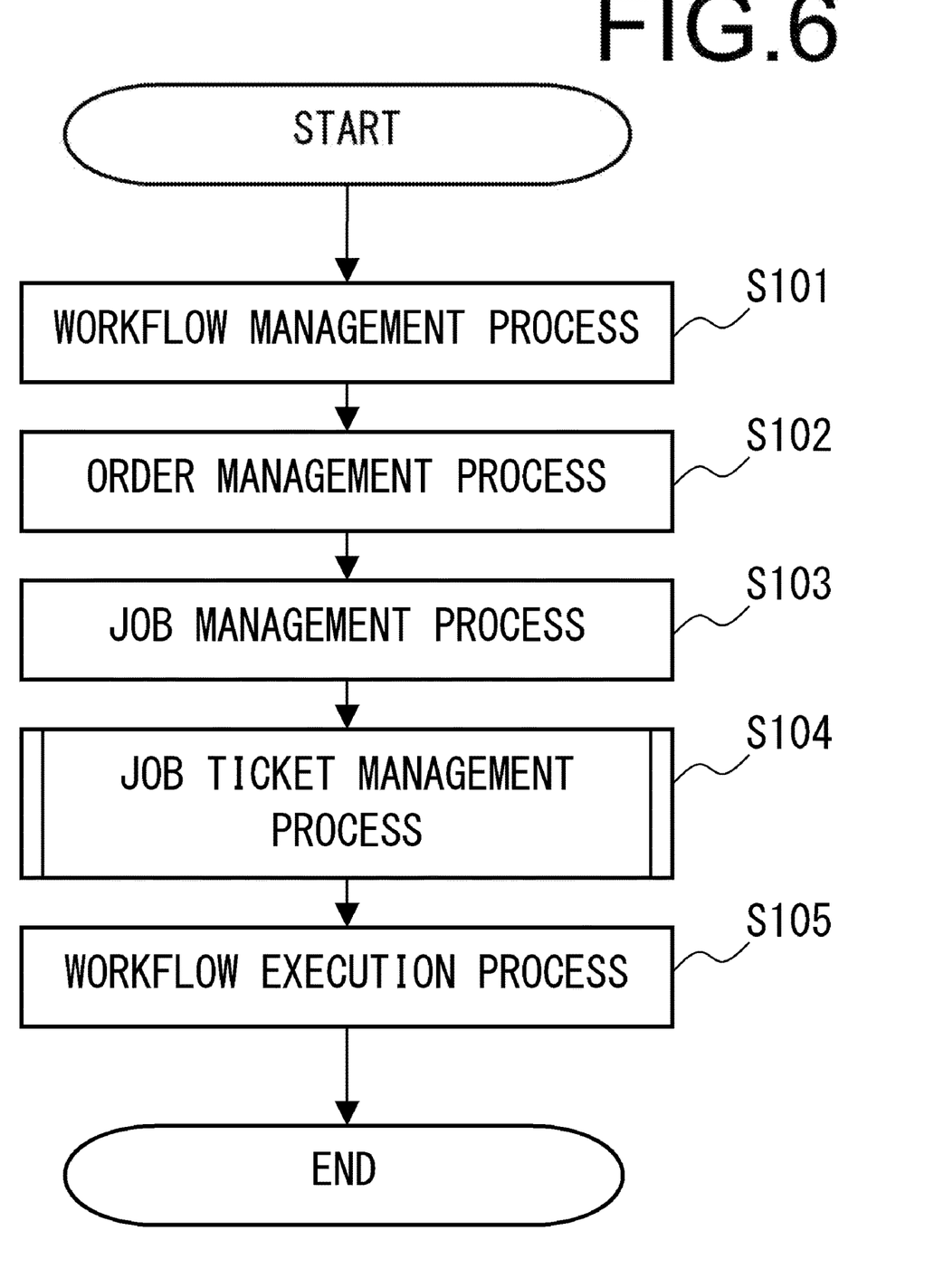
FIG. 6 is a flowchart of workflow processing according to the embodiment of the present disclosure.

In the workflow process according to the present embodiment, the control unit 10 mainly executes the program stored in the storage unit 19 in cooperation with each unit and uses the hardware resources.

In the following, with reference to the flowchart of FIG. 6, the details of the workflow process according to the present embodiment is described step by step.

(Step S101)

Firstly, the workflow management unit 100 performs the workflow management process.

Workflow management unit 100 creates and manages the workflow.

Figure 7:
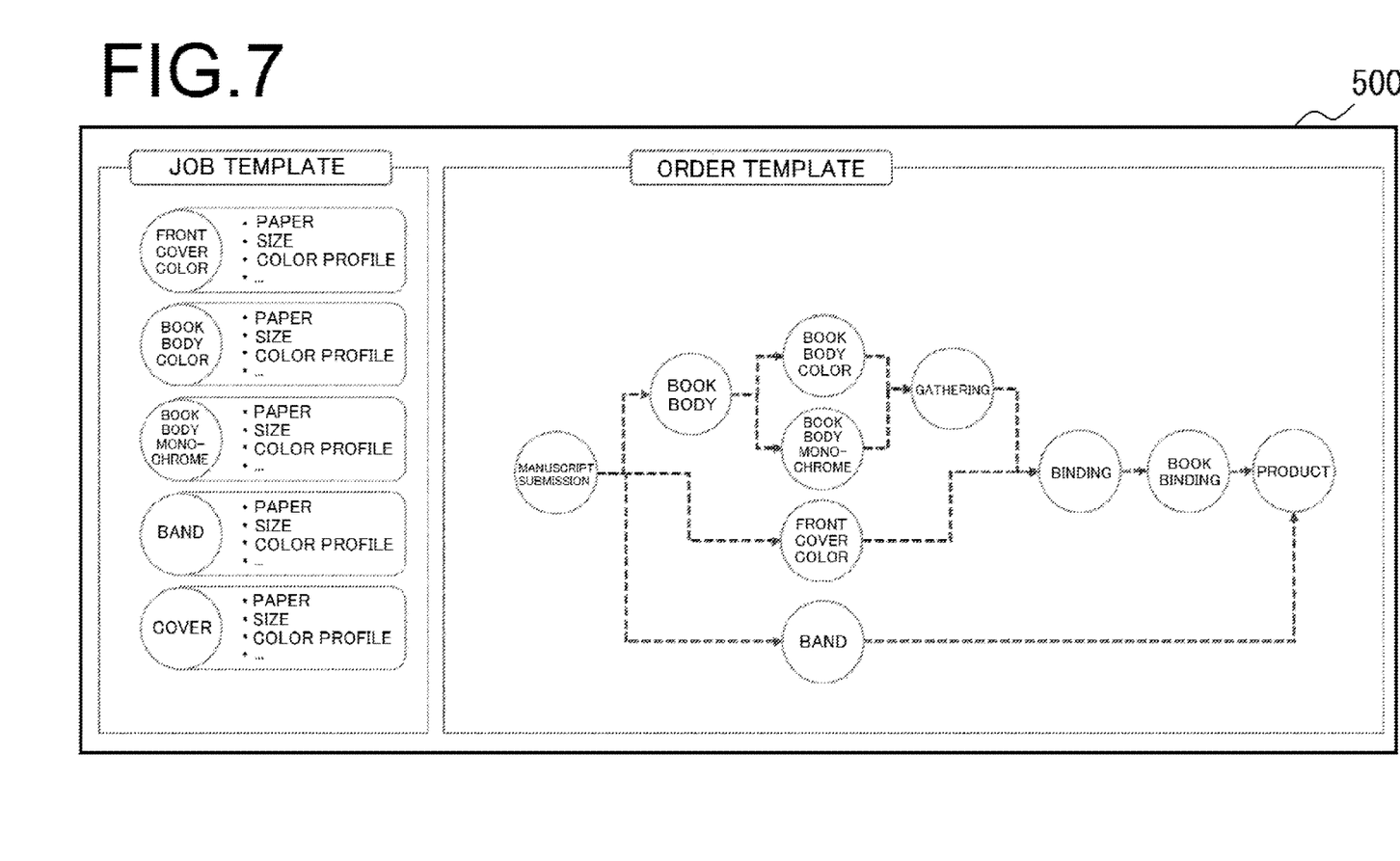
FIG. 7 is a screen example of the workflow management process as shown in FIG. 6.

This is described with reference to the screen example 500 of FIG. 7. The workflow management unit 100 uses the workflow creation unit 101 to acquire the administrator's instruction as order information from the administrator terminal 3. The workflow management unit 100 creates the workflow by combining the job template with the order template based on the order information. At this time, the workflow management unit 100 creates a component for each process of processing each composing job of the order, and it creates a workflow in which they are linked.

Specifically, the workflow management unit 100 can set the paper, size, color profile, or the like, for each job template. Further, the workflow management unit 100 can set in the order template how to proceed with the job from the job template. In addition, the workflow management unit 100 can also set the above-mentioned unplanned processing.

(Step S102)

Next, the order management unit 110 performs the order management process.

The order management unit 110 manages each job composing the order as an order template. The order management unit 110 sets and executes the details of the order by using the order creation unit 111, the order processing unit 112, the order status management unit 113, the order template creation unit 114, and the submission data analysis unit 115.

The order management unit 110 sets the job template corresponding to each component and its association in the order template for each workflow according to the workflow.

Figure 8:
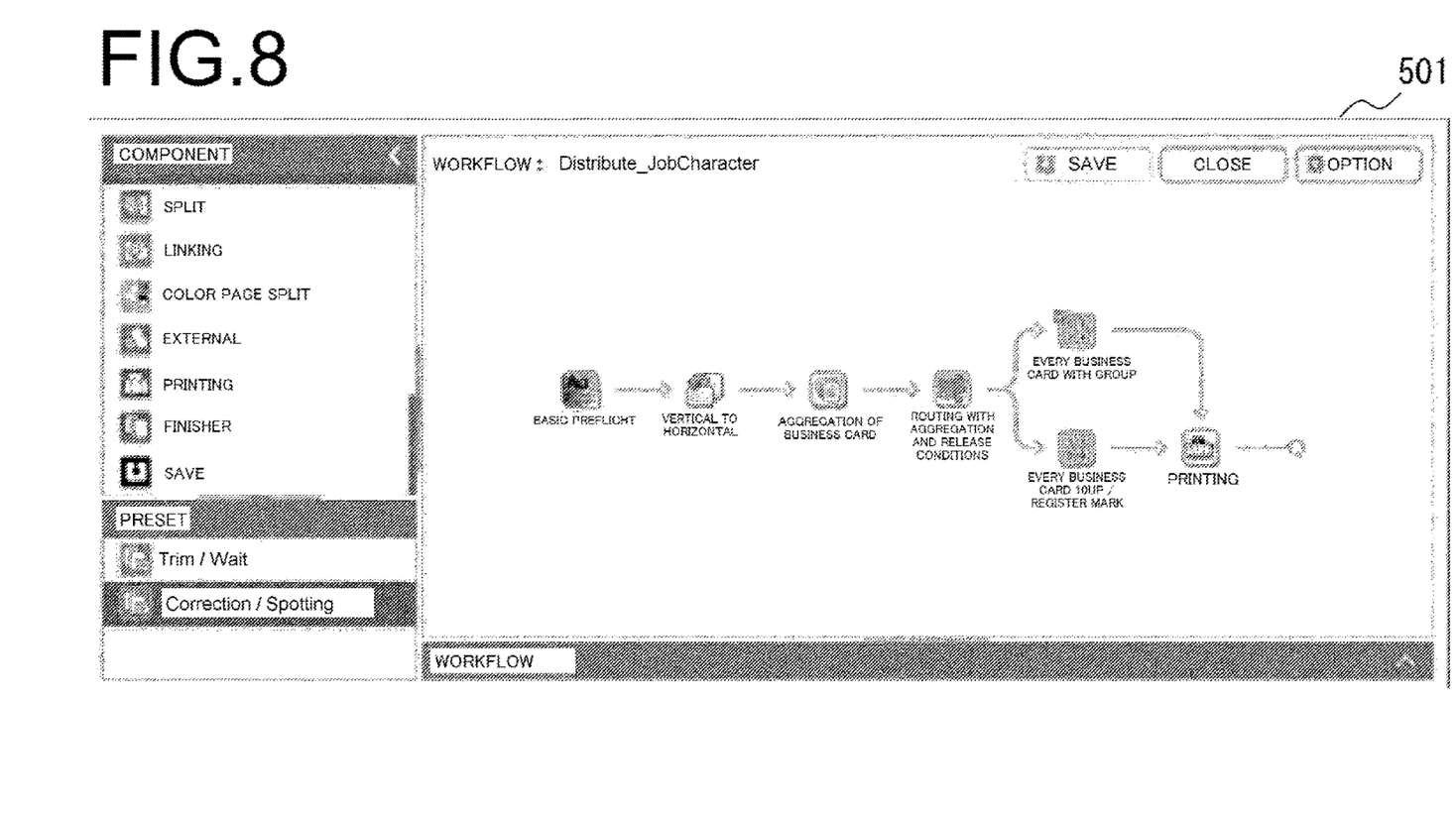
FIG. 8 is a screen example of the order management process as shown in FIG. 6.

This is described with reference to the screen example 501 of FIG. 8. The order management unit 110 sets the details of each job in the order template of the workflow based on the acquired order information. In the example of FIG. 8, as the type of the component apparatus 2, the procedure how to associate and print the data with the printing apparatus is set.

Figure 9:
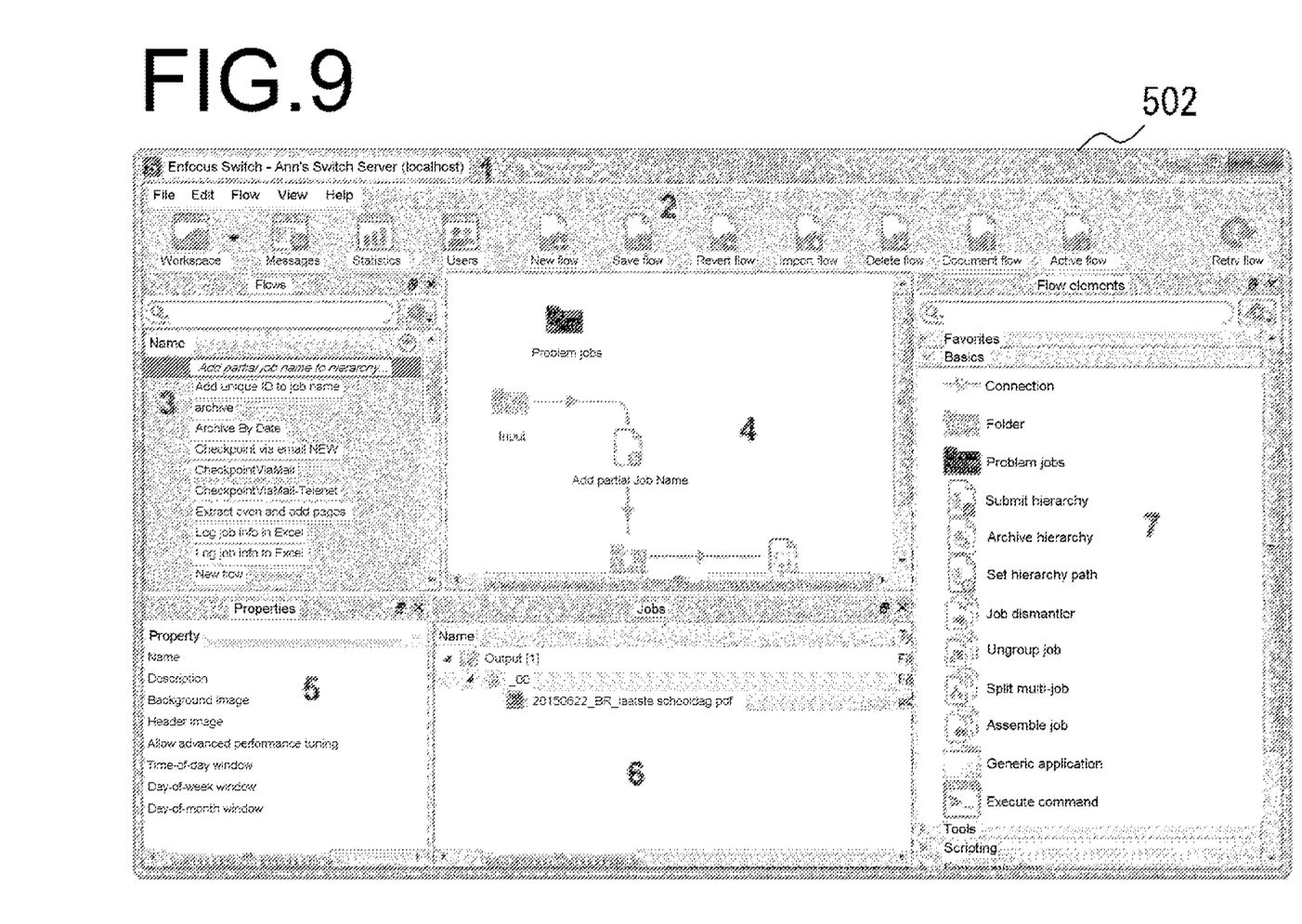
FIG. 9 is a screen example of the job management process as shown in FIG. 6.

This is described with reference to screen example 502 of FIG. 9. The order management unit 110 can set the process-ing flow of each job on the order template. In the example of FIG. 9, the flow of job processing is set by specifying how to connect each component.

(Step S103)

Next, the job management unit 120 performs the job management process.

The job management unit 120 manages the processing of the jobs managed by the order template by using the job creation unit 121, the job processing unit 122, the job status management unit 123, and the job template creation unit 124.

In the present embodiment, the job management unit 120 acquires order change information from the component apparatus 2 and the administrator terminal 3. In this case, the job management unit 120 calculates the job to be changed from each job managed by the order management unit 110.

Specifically, as a processing example when the order content is changed, the job management unit 120 identifies the object of the job to be changed from the order change information. For example, if the cover page is changed, the job management unit 120 searches the order template and identifies that the change target is the cover page object.

(Step S104)

Next, the job ticket management unit 130 performs the job ticket management process.

The job ticket management unit 130 generates a job ticket for requesting the change processing of the job to be changed that is calculated by the job management unit 120. The job ticket management unit 130 generates the job ticket for requesting processing to each component apparatus 2.

The details of this process are described later.

(Step S105)

Next, the workflow processing unit 140 performs the workflow execution process.

The workflow processing unit 140 performs change processing of the job to be changed based on the job ticket generated by the job ticket management unit 130. The workflow processing unit 140 uses the component processing unit 141 to select an appropriate component apparatus 2 for the job to be changed and change the processing.

With the above, the workflow process according to the embodiment of the present disclosure is completed.

Figure 10:
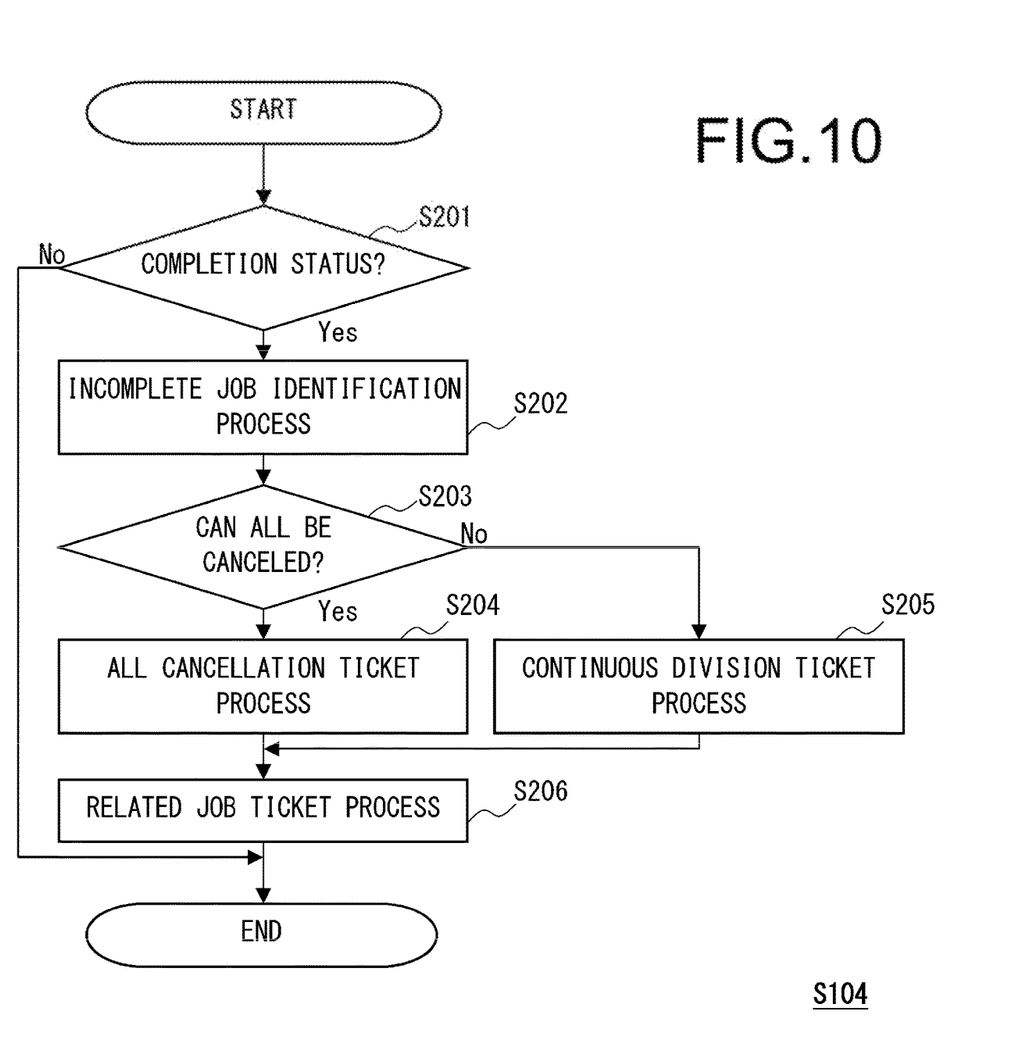
FIG. 10 is a flowchart showing the details of the job ticket management process as shown in FIG. 6.

Next, with reference to FIG. 10, the details of the job ticket management process are described step by step.

(Step S201)

If the unplanned processing occurs, the job ticket management unit 130 first determines whether the status is complete or not. The job ticket management unit 130 confirms the status of the job to be changed that is calculated by the job management unit 120. The job ticket management unit 130 determines Yes if the status of this job has already reached the completion status. The job ticket management unit 130 determines No in other cases.

In the case of Yes, the job ticket management unit 130 advances the process to step S202.

In the case of No, the job ticket management unit 130 ends the job ticket management process and continues executing the job to be changed.

(Step S202)

If the job status is already complete, the job ticket management unit 130 performs incomplete job identification process.

The job ticket management unit 130 refers to the order template of the workflow that is set, searches downstream of the job that is already in the completed status, and identifies the incomplete job. Specifically, the job ticket management unit 130 searches the order template and identifies downstream incomplete job objects. For example, when the status of the "binding" job object has already been completed, the job ticket management unit 130 refers to the status of the downstream "bookbinding" job. Then, the job ticket management unit 130 identifies the bookbinding job as an incomplete job object if this is incomplete.

(Step S203)

Next, the job ticket management unit 130 determines whether all can be canceled or not. The job ticket management unit 130 determines Yes if all the identified incomplete jobs can be canceled. The job ticket management unit 130 determines No if others.

In the case of Yes, the job ticket management unit 130 advances the process to step S204.

In the case of No, the job ticket management unit 130 proceeds to step S205.

(Step S204)

If all the incomplete jobs can be canceled, the job ticket management unit 130 processes all cancellation ticket process.

The job ticket management unit 130 cancels all the incomplete jobs and generates a job ticket corresponding to the changed content. The job ticket management unit 130 generates the job ticket for causing the component apparatus 2 corresponding to the identified incomplete job object to perform the changing process. In this process, the job ticket management unit 130 creates a job ticket that cancels the corresponding process and reprocesses it according to the changed content. Specifically, the job ticket management unit 130 generates a job ticket based on the job ticket template, the order change information, and the changed content.

(Step S205)

If all the incomplete job cannot be canceled, the job ticket management unit 130 performs continuous division ticket process.

The job ticket management unit 130 divides the job into a cancel job and a sustainable job and performs processing when the job is to be changed and only apart of the job can be canceled. Note that if there is no sustainable job, this process is not performed.

Specifically, the job ticket management unit 130 refers to the status of the incomplete job object and divides it into a job to be canceled (cancelled job) and a sustainable job. On this basis, the job ticket management unit 130 generates a job ticket from the changed contents and reprocesses the canceled job. On the other hand, the job ticket management unit 130 creates a job ticket from which the canceled portion is removed for the sustainable job, and it requests the component processing unit 141 to process the job ticket.

In the present embodiment, the job ticket management unit 130 generates a job ticket from the changed contents for the canceled job. On the other hand, the job ticket management unit 130 generates a job ticket for the sustainable job by removing the part to be canceled.

For example, if the cover page changes and the binding job is identified as the incomplete job object, that is, the processes up to a color printing of "book body color", a black and white printing of "book body black and white", a "folding", and "binding" job are completed, the job ticket management unit 130 generates a job ticket for canceling the job of the cutting process of the "bookbinding". On this basis, the job ticket management unit 130 also includes an instruction for reprocessing from the submission from the changed contents in the job ticket.

Further, for example, in case that the order is for a variable book in which at least a part of the contents is different for each book, and a change is made to a specific book (record), the job ticket management unit 130 generates a job ticket that cancels the record to be changed. For example, when canceling 5th, 10th, and 15th records, the job ticket management unit 130 removes the records to be changed and generates a job ticket including an instruction to perform cutting processing. In addition, the job ticket includes an instruction to generate a job ticket of only the record to be changed from the changed contents and reprocess from submission.

(Step S206)

Here, the job ticket management unit 130 processes related job ticket process.

The job ticket management unit 130 performs a continuation or cancellation process for the related job, which is not subject to change and is not affected by the change, based on the job settings. That is, the job ticket management unit 130 performs continuation or cancellation processing for the related job based on the setting specified in the job template. Specifically, the job ticket management unit 130 manages the status and processing result of each job object of the order object by setting either continuation of processing or cancellation of processing.

For example, if continuation is specified for the band job, the job ticket management unit 130 causes the process to be performed as it is, and after the manual processing process is performed, obtains the status, and then is to execute the bookbinding job. When the job ticket management unit 130 generates the job ticket from the changed contents, whether or not to include the reprocessing of the band job that is a related job can be set based on the setting specified in the job template. Specifically, the job ticket management unit 130 may be set such that processing of related jobs is included in the case of cancellation and not included in the case of continuation.

With the above, the job ticket management process according to the embodiment of the present disclosure is completed.

The following effects can be obtained by configuring as described above.

In typical technology related to production printing and industrial printing, when a change, cancellation, reprocessing request, or the like, occurs for an order such as a book, a person handles and works the corresponding process after confirming the job status in each process. That is, at the actual printing site by using the typical industrial printing system, confirmation and correction request work is performed, manually. Therefore, if there is a change in the order, it takes time and effort.

On the other hand, the industrial printing system X according to the embodiment of the present disclosure includes: an order management unit 110 that manages each of jobs that composes an order, which is the final product of a workflow of industrial printing, as an order template; a job management unit 120 that calculates a job to be changed from each of the jobs managed by the order management unit 110 when the change information of the order is acquired; a job ticket management unit 130 that generates a job ticket for requesting the change processing of the job to be changed that is calculated by the job management unit 120; and a workflow processing unit 140 that performs change processing of the job to be changed based on the job ticket generated by the job ticket management unit 130.

As configured in this way, the dependency between a plurality of jobs that composes the order is defined by using the template, and the dependency between the job objects can be clarified by generating the order and job template related to the workflow. Therefore, each composing job for unplanned work that occurs in the order can be processed, automatically, according to the dependency. That is, even if there is a change in the order, time and effort can be saved by managing the processing status of each process and processing with automatically coordinating between the processes.

In addition, the industrial printing system X according to the present embodiment identifies in advance the processing when unplanned processing occurs in the template according to the urgency and importance of the order, the difficulty of interrupting the work, and the like. Thus, the flexibility to adapt to changes can be achieved.

Further, in the industrial printing system. X according to the embodiment of the present disclosure, the job ticket management unit 130 confirms the status of the job to be changed, and if it is already in the completed status, identifies the downstream incomplete job.

As configured in this way, in a production printing job that requires complicated processing, an unplanned processing can be automatically determined and perform change processing.

Further, in the industrial printing system X according to the embodiment of the present disclosure, if the job ticket management unit 130 can cancel all the incomplete jobs, the job ticket management unit 130 cancels all the incomplete jobs and generates a job ticket corresponding to the changed contents.

As configured in this way, all jobs identified as incomplete can be canceled and perform the process again.

Further, in the industrial printing system. X according to the embodiment of the present disclosure, if the job ticket management unit 130 can cancel a part of the incomplete job, the job ticket management unit 130 divides the incomplete job into a cancel job and a sustainable job, generates the job ticket by the changed contents for the cancel job, and generates the job ticket by removing canceled part for the sustainable job.

As configured in this way, even if all the jobs cannot be cancelled, changing the job processing can be performed with less effort.

Further, in the industrial printing system. X according to the embodiment of the present disclosure, the job management unit 120 performs continuation or cancellation processing for a related job that is not subject to change based on a setting of the job.

As configured in this way, other necessary processing can be executed without changing the related job.

OTHER EMBODIMENTS

In addition, in the above embodiment, an example by using structured data such as XML as an order template has been described.

However, as structured data, data in a format such as a macro language or programming language that can create object format data can be used. Alternatively, the intermediate data or binary data can be generated from text format data, or the intermediate data or binary data can be used as an object.

Further, in the above-described embodiment, although an example that the component processing is executed by the corresponding component apparatus 2 is described, the function of one apparatus may be called to process. Alternatively, the number, type, designation, or the like, for the component apparatuses 2 may be variable according to the setting of the order template.

Further, each job object may be executed from upstream to downstream or may be connected from downstream to upstream. In this case, the downstream incomplete job may be searched until before it is connected to the upstream.

As configured in this way, order templates for various orders can be applied.

Further, in the above-described embodiment, an example of controlling the component apparatus 2 and sending an e-mail as the job ticket has been described.

However, as a job ticket, a process necessary for various changes can be executed such as packet transmission of an industrial network, error notification, message transmission to the administrator terminal 3, or the like. Alternatively, an SMS or a telephone voice message may be sent to the user of each component apparatus 2.

Furthermore, a job ticket that executes unplanned processing different from sending to the component apparatus 2 for the job object can be set. For example, a job ticket that instructs another component apparatus 2 to print a typographical sticker can be generated. Alternatively, a job ticket that orders a part and a consumable required for printing and post-processing can be generated.

Further, in the above-described embodiment, although an example of commercial printing of a book is described as an order, it can also be applied to other industrial printing.

For example, variable book printing, on-demand printing, and other printing can be applied.

Alternatively, for example, split printing of large-format posters, sheet printing for exteriors and interiors of aircraft and automobiles, manufacturing of electronic components such as flat displays and electronic substrates, printing of cultured cells, or the like, can be applied. In this case, as the component apparatus 2, an industrial inkjet printer, an industrial robot, various reaction apparatuses, a culture apparatuses, and the like, can also be used.

As configured in this way, it can be used for various purposes.

The present disclosure can also be applied to an information processing apparatus other than image forming apparatuses. That is, a network scanner, a server in which the scanner is separately connected by USB, or the like, may be used.

Further, it is needless to say that the configuration and operation of the above-described embodiment are examples and can be appropriately modified and executed without departing from the gist of the present disclosure.

What is claimed is:

1. An industrial printing system comprising:
    an order management unit configured to manage each job of a plurality of jobs that composes an order, which is the final product of a workflow of industrial printing, as an order template;
    a job management unit configured to calculate a job to be changed from each of the jobs managed by the order management unit when the change information of the order is acquired;
    a job ticket management unit configured to generate a job ticket for requesting change processing of the job to be changed that is calculated by the job management unit; and
    a workflow processing unit configured to perform change processing of the job to be changed based on the job ticket generated by the job ticket management unit, wherein
    the order template includes dependency between the plurality of jobs that composes the order, and the job ticket management unit is configured to generate the job ticket for unplanned processing that occurs in the order according to the dependency included in the order template.

2. The industrial printing system according to claim 1, wherein
the job ticket management unit, when the unplanned processing occurs, confirms a status of the job to be changed and, when being already in the completed status, identifies a downstream incomplete job based on the dependency in the order template.

3. The industrial printing system according to claim 2, wherein
the job ticket management unit is configured to cancel all incomplete jobs and configured to generate the job ticket corresponding to the changed contents when all the incomplete jobs are allowed to be canceled.

4. The industrial printing system according to claim 2, wherein
when a part of incomplete jobs is allowed to be canceled, the job ticket management unit is configured to divide the incomplete jobs into a cancel job and a sustainable job, generate the job ticket by the changed contents for the cancel job, and generate the job ticket by removing a canceled part for the sustainable job.

5. The industrial printing system according to claim 4, wherein
the job ticket management unit, when generating the job ticket for canceling the job, includes an instruction for reprocessing from the submission from the changed contents in the job ticket.

6. The industrial printing system according to claim 4, wherein
the job ticket management unit generates the job ticket that cancels the record to be changed in case that the order is for a variable book in which at least a part of the contents is different for each book.

7. The industrial printing system according to claim 1, wherein
the job management unit configured to perform continuation or cancellation processing for a related job that is not subject to change based on a setting of the related job.

8. The industrial printing system according to claim 7, wherein
when the job ticket management unit generates the job ticket from the changed contents, whether or not to include the reprocessing of related jobs is included in the case of cancellation and not included in the case of continuation.

9. The industrial printing system according to claim 1, wherein
the job ticket management unit identifies in advance the processing when the unplanned processing occurs in the order template according to the urgency and importance of the order, or the difficulty of interrupting the work.

10. The industrial printing system according to claim 1, wherein the unplanned processing occurs as a result of an exception handling setting.

11. A server for an industrial printing system comprising:
an order management unit configured to manage each job of a plurality of jobs that composes an order, which is the final product of a workflow of industrial printing, as an order template;
a job management unit configured to calculate a job to be changed from each of the jobs managed by the order management unit when change information of the order is acquired;
a job ticket management unit configured to generate a job ticket for requesting change processing of the job to be changed that is calculated by the job management unit; and
a workflow processing unit configured to perform the change processing of the job to be changed based on the job ticket generated by the job ticket management unit, wherein
the order template includes dependency between the plurality of jobs that composes the order, and
the job ticket management unit is configured to generate the job ticket for unplanned processing that occurs in the order according to the dependency included in the order template.

12. The server according to claim 11, wherein
the job ticket management unit is configured to confirm, when the unplanned processing occurs, a status of the job to be changed and, when being already in completed status, identify a downstream incomplete job based on the dependency in the order template.

13. The server according to claim 12, wherein
the job ticket management unit configured to cancel all incomplete jobs and generates the job ticket corresponding to the changed contents when all the incomplete jobs are allowed to be canceled.

14. The server according to claim 12, wherein
when a part of incomplete jobs is allowed to be canceled, the job ticket management unit is configured to divide the incomplete jobs into a cancel job and a sustainable job, generate the job ticket by the changed contents for the cancel job, and generate the job ticket by removing a canceled part for the sustainable job.

15. The server according to claim 11, wherein
the job management unit performs continuation or cancellation processing for a related job that is not subject to change based on a setting of the related job.

16. An industrial printing management method executed by an industrial printing system, comprising the steps of:
managing each job of a plurality of jobs that composes an order, which is the final product of a workflow of industrial printing, as an order template;
calculating a job to be changed from each of managed jobs when change information of the order is acquired;
generating a job ticket for requesting change processing of the job to be changed; and
performing the change processing of the job to be changed based on generated job ticket, wherein
the order template includes dependency between the plurality of jobs that composes the order, and
the generating step comprises generating the job ticket for unplanned processing that occurs in the order according to the dependency included in the order template.

17. The industrial printing management method according to claim 16, further comprising a step of:
Confirming when the unplanned processing occurs, a status of the job to be changed and, when being already in completed status, identifying a downstream incomplete job based on the dependency in the order template.

18. The industrial printing management method according to claim 17, further comprising a step of:

canceling all incomplete jobs and generating the job ticket corresponding to the changed contents when all the incomplete jobs are allowed to be canceled.

19. The industrial printing management method according to claim 17, further comprising the steps of:

dividing, when a part of incomplete jobs is allowed to be canceled, the incomplete jobs into a cancel job and a sustainable job, generating the job ticket by the changed contents for the cancel job, and generating the job ticket by removing a canceled part for the sustainable job.

20. The industrial printing management method according to claim 16, further comprising a step of:

performing continuation or cancellation processing for a related job that is not subject to change based on a setting of the related job.

\* \* \* \* \*